(12) United States Patent
Stuart et al.

(10) Patent No.: US 7,137,183 B2
(45) Date of Patent: Nov. 21, 2006

(54) DRIVE AXLE FOR MOTOR VEHICLES AND METHOD FOR ASSEMBLING THE SAME

(75) Inventors: Edward Eugene Stuart, Payne, OH (US); Timothy Bernard Allmandinger, Roanoke, IN (US); Sean Karl Hoefer, Wabash, IN (US); Earl James Irwin, Fort Wayne, IN (US); Parvinder Singh Nanua, Fort Wayne, IN (US); Gregory James Maser, Fort Wayne, IN (US)

(73) Assignee: Torque-Traction Technologies, Inc., Maumee, OH (US)

( * ) Notice: Subject to any disclaimer, the term of this patent is extended or adjusted under 35 U.S.C. 154(b) by 373 days.

(21) Appl. No.: 10/695,877

(22) Filed: Oct. 30, 2003

(65) Prior Publication Data
US 2005/0091823 A1    May 5, 2005

Related U.S. Application Data

(63) Continuation-in-part of application No. 10/101,188, filed on Mar. 20, 2002, now Pat. No. 6,729,207.

(51) Int. Cl.
*F16H 57/02* (2006.01)
(52) U.S. Cl. .......... 29/434; 301/109; 301/110; 301/137; 74/606 R; 74/607; 180/378; 29/462; 29/463; 29/525.11
(58) Field of Classification Search ........ 301/109, 301/110, 137; 180/378; 29/462
See application file for complete search history.

(56) References Cited

U.S. PATENT DOCUMENTS

| | | | |
|---|---|---|---|
| 899,891 A | 9/1908 | Niclausse | |
| 1,002,858 A | 9/1911 | McCue | |
| 1,076,500 A | 10/1913 | Duffy | |
| 1,076,559 A | 10/1913 | Duffy | |
| 1,386,510 A | 8/1921 | Kraft | |
| 2,612,231 A | 9/1952 | Bretschneider | |
| 3,170,534 A | 2/1965 | Kelley et al. | |
| 3,792,625 A | 2/1974 | Asberg | |
| 4,594,912 A | 6/1986 | Ishikawa | |
| 4,841,802 A * | 6/1989 | Peck | 74/607 |
| 5,188,195 A | 2/1993 | Haustein | |
| 5,271,294 A * | 12/1993 | Osenbaugh | 74/607 |
| 5,297,855 A * | 3/1994 | Jeng | 301/124.1 |

FOREIGN PATENT DOCUMENTS

| | | |
|---|---|---|
| GB | 2 295 588 A | 6/1996 |
| WO | WO 03/080366 A2 | 10/2003 |

* cited by examiner

*Primary Examiner*—Marc Jimenez
*Assistant Examiner*—Christopher Agrawal
(74) *Attorney, Agent, or Firm*—Berenato, White & Stavish

(57) ABSTRACT

A drive axle assembly for motor vehicles, includes a support beam member having a substantially flat, enlarged central plate section and two opposite arm sections, a differential assembly module secured to the central plate section and enclosed into a housing formed by a rear cover and a front cover secured to opposite surfaces of the central plate section. A method for assembling the drive axle assembly comprises the steps of securing the front cover to a front mounting surface of the support beam member, fastening the differential assembly module to the central plate section of the support beam member, and fastening the rear cover to the rear mounting surface of the support beam member.

20 Claims, 7 Drawing Sheets

DRIVE AXLE FOR MOTOR VEHICLES AND METHOD FOR ASSEMBLING THE SAME

CROSS-REFERENCE TO RELATED APPLICATION

This Application is a continuation-in-part of U.S. Application Ser. No. 10/101,188, filed on Mar. 20, 2002 now U.S. Pat. No. 6,729,207.

BACKGROUND OF THE INVENTION

1. Field of the Invention

The present invention relates to axle assemblies for motor vehicles and methods for assembling thereof in general, and more particularly to a method for assembling axle assemblies.

2. Description of the Prior Art

Rigid drive axle assemblies are well known structures that are in common use in most motor vehicles. Such axle assemblies include a number of components that are adapted to transmit rotational power from an engine of the motor vehicle to wheels thereof. Typically, the rigid drive axle assembly includes a hollow axle housing, a differential, which is rotatably supported within the axle housing by a non-rotating carrier. The differential is connected between an input drive shaft extending from the vehicle engine and a pair of output axle shafts extending to the vehicle wheels. The axle shafts are contained in respective non-rotating tubes that are secured to the carrier. Thus, rotation of the differential by the drive shaft causes corresponding rotation of the axle shafts. The carrier and the tubes form a housing for these drive train components of the axle assembly, inasmuch as the differential and the axle shafts are supported for rotation therein.

The axle housings are generally classified into two basic types. The first axle housing type is a unitized carrier construction, commonly referred to as a Salisbury type axle assembly, illustrated in FIG. 1. In this structure, the Salisbury type axle assembly 301 includes a carrier 312 (which houses a rotatable differential mechanism 340) is directly connected to the two tubes 316 and 317 (which house the rotatable axle shafts 320). An opening is provided at the rear of the carrier to permit assembly of the differential therein. A cover 326 closes this opening during the use. The cover 326 is connected by bolts (not shown) to a rear face 330 of the carrier 312 hydraulically seals the housing against the passage of lubricant. A brake assembly 314 located at the end of a tube 316 extending outboard from the ends of an axle carrier 312. Located within the differential case is a drive pinion 332 rotatably supported by a rear drive pinion bearing 334 and a front drive pinion bearing (not shown) supported on the inner surface of a portion of the axle carrier casing 338 that extends forward from the center line of the axle assembly. A driveshaft, driveably connected to the output shaft of a transmission, is coupled to the shaft of the drive pinion 332. The differential mechanism 340, located within the differential case 348, includes a ring gear 342, in continuous meshing engagement with drive pinion 332 and supported rotatably on the differential rear drive pinion bearing 334 and the front drive pinion bearing located within the housing gear and cylindrical extension 338 of the carrier 312. The axle carrier 312 also includes laterally directed tubular extensions 344, 346, which receive therein the ends of housing tubes 316 and 317, respectively. Located within the carrier 312 is a differential case 348, on which bevel pinion gears 350, 352 are supported for rotation on a differential pinion shaft 354. Side bevel gears 356, 358 are in continuous meshing engagement with pinions 350, 352 and are driveably connected to left and right axle shafts 320, located respectively within tubes 316 and 317. The axle shaft 320 is connected to the corresponding side bevel gear 356. Unitized carrier axle housing constructions of this type are economical to manufacture and are readily adaptable for a variety of vehicles.

The second axle housing type is a separable carrier construction, and is commonly referred to as a Banjo type axle, illustrated in FIG. 2. In this structure, the Banjo type axle 401 includes an axle housing 402 having axle tubes 406a and 406b connected together by a central member 404. The axle tubes 406a and 406b are adapted to receive and rotatably support output axle shafts 414a and 414b. The axle housing 402 is formed separate and apart from a carrier 422. This central member 404 is generally hollow and cylindrical in shape, having a large generally circular opening 410 formed therethrough. During assembly, a differential 420 is first assembled within the carrier 422, then the carrier 422 is secured to the central member 404 of the axle housing 402. The overall shape of this type of axle housing (i.e., the generally round shape of the central member 404 and the elongated tubes 406a and 406b extending therefrom) generally resembles the shape of a banjo musical instrument. Hence, this type of axle housing is referred to as the Banjo type axle housing. The Banjo type axle housings are advantageous because the carrier 422 and differential 420 can be removed from the axle assembly 401 for service without disturbing the other components thereof.

However, both Banjo and Salisbury type axles have their disadvantages. Thus, there is a need for a rigid drive axle assembly that combines the advantages of both Banjo and Salisbury type axles and lessens their shortcomings.

SUMMARY OF THE INVENTION

The present invention provides a novel rigid drive axle assembly for motor vehicles. The rigid drive axle assembly in accordance with the present invention comprises a support beam member having a substantially flat, enlarged central plate section and two opposite arm sections extending axially outwardly from the central plate section. The flat enlarged central section is further provided with a central opening therethrough.

The drive axle assembly further comprises a differential assembly module fastened to the enlarged central plate section of the support beam member, and two opposite axle shaft members outwardly extending from the differential assembly module, and rotatably supported by the arm sections of the support beam member so that the axle shaft members are spaced from the central plate section of the support beam member in a driving direction of the motor vehicle. Distal ends of the axle shaft members are provided with flange members adapted for mounting corresponding wheel hubs. The differential assembly module is enclosed into a housing formed by a rear cover and a front cover secured to opposite surfaces of the central plate section of the beam member.

The differential assembly module includes a differential carrier frame member fastened to the central plate section of the support beam member, and provided for rotatably supporting a differential case and a drive pinion. The differential case houses a conventional differential gear mechanism, well known to those skilled in the art. The drive pinion has a pinion gear in continuous meshing engagement with a ring gear, and a pinion shaft operatively coupled to a vehicular drive shaft driven by a vehicular powerplant through an input yoke. The differential assembly module is enclosed into a housing formed by a rear cover and a front cover secured to opposite surfaces of the central plate section of the beam member in any appropriate manner well known in the art. The front cover has a front opening for rotatably supporting and receiving therethrough a distal end of the pinion shaft of the drive pinion. The rear cover incorporates two opposite through holes for receiving the axle shaft members therethrough. Each of the through holes is provided with a self-centering seal.

The differential carrier frame member is, preferably, a single-piece metal part manufactured by casting or forging. The differential carrier frame member has a generally Y-shaped configuration and includes a neck portion and two opposite, axially spaced, coaxial bearing hub portions attached to the neck portion through respective leg portions. The neck portion has an opening therethrough adapted for receiving and rotatably supporting the drive pinion through appropriate anti-friction bearings, preferably roller bearings. The bearing hub portions are provided with respective openings therethrough adapted for receiving appropriate anti-friction bearings for rotatably supporting the differential carrier. Moreover, the bearing hub portions are provided with mounting flange portions.

A method for assembling the drive axle assembly of the present invention comprises the steps of fastening the differential carrier frame member of the differential assembly module to a rear mounting surface of the support beam member so that the neck portion of the differential carrier frame member extends through the opening in the support beam member, placing the front cover of the drive axle assembly over the neck portion of the differential carrier frame member so that a distal end of a pinion shaft of the drive pinion of the differential assembly module extends through an opening in the front cover, securing the front cover to a front mounting surface of the axle support beam member, and fastening the rear cover to a rear mounting surface of the axle support beam member.

Therefore, the rigid drive axle assembly and the method for assembling it in accordance with the present invention represents a novel arrangement of the drive axle assembly and assembling technique providing a number of advantages over the currently employed Salisbury and Banjo style axles, such as improved strength to weight ratio, ease of manufacturing and reduced manufacturing cost due to the use of simple metal stampings to produce the support beam member and the front cover, ease of assembly/disassembly and servicing of the axle assembly, and improved modularity and commonality of axle components.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings. As used herein, the words "front" and "rear" in the following description are referred with respect to a driving direction of a motor vehicle, as indicated in the accompanying drawing figures by an arrow F.

Figure 1:
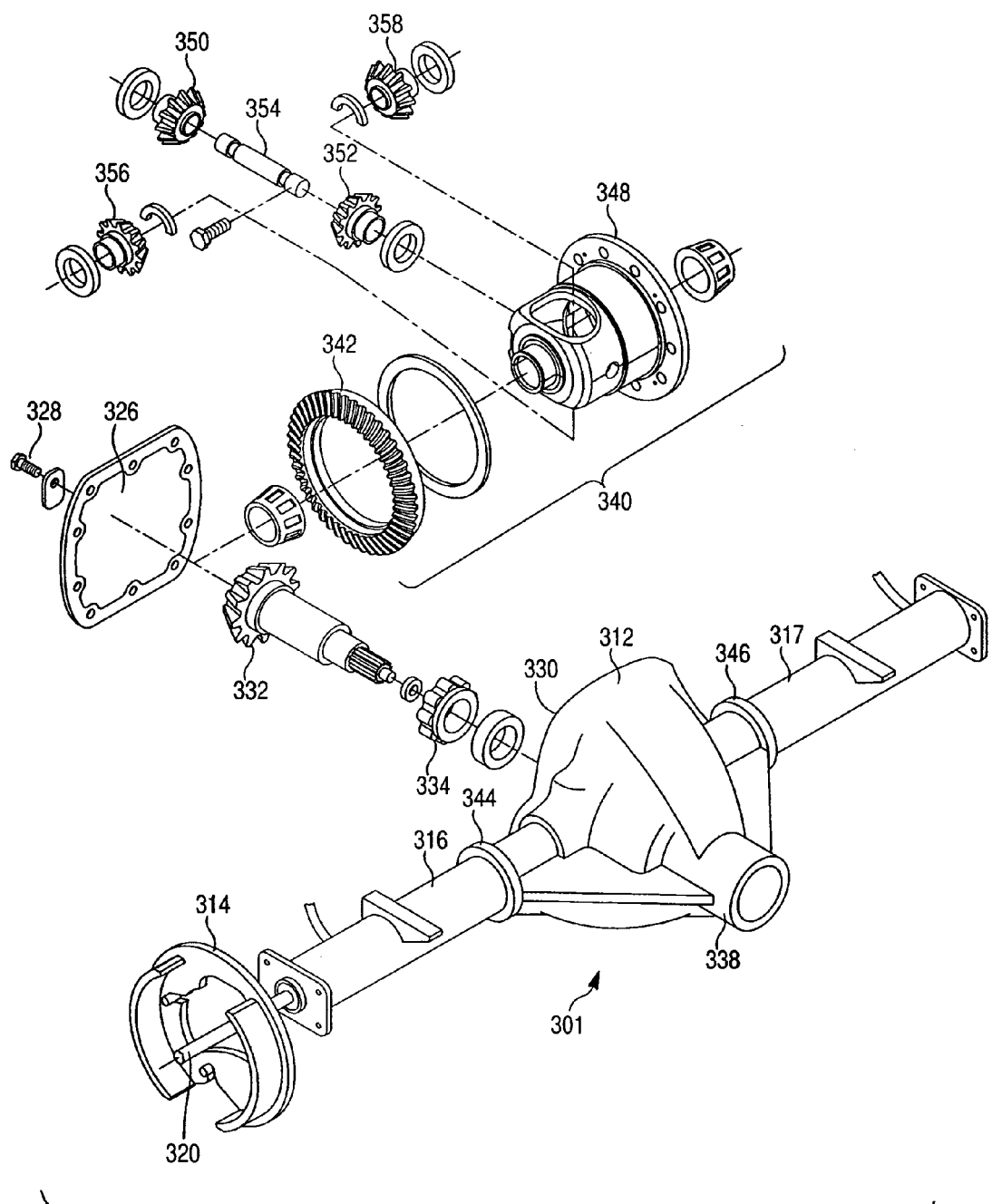
FIG. 1 is an exploded perspective view of a typical Salisbury type drive axle assembly of the prior art.
Figure 2:
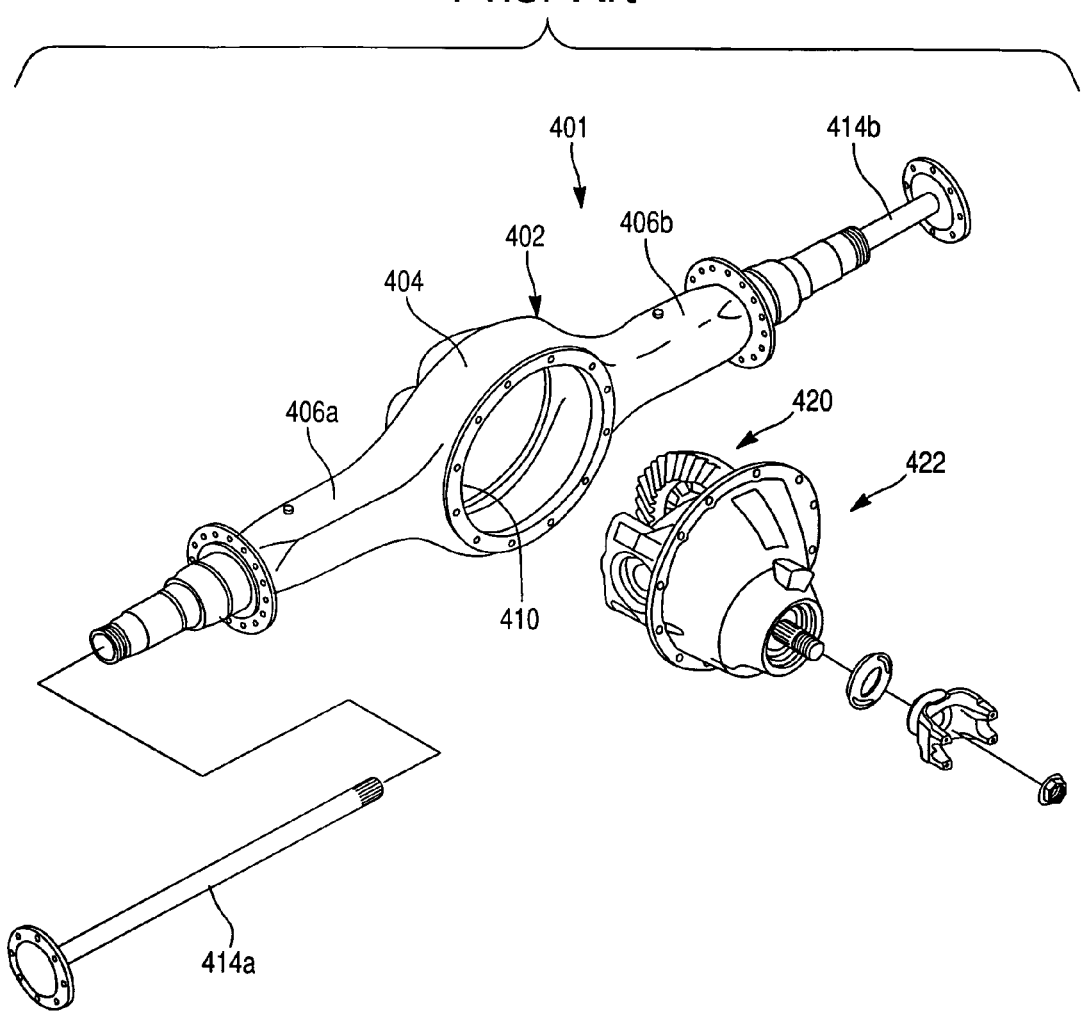
FIG. 2 is an exploded perspective view of a typical Banjo type drive axle assembly of the prior art.
Figure 3:
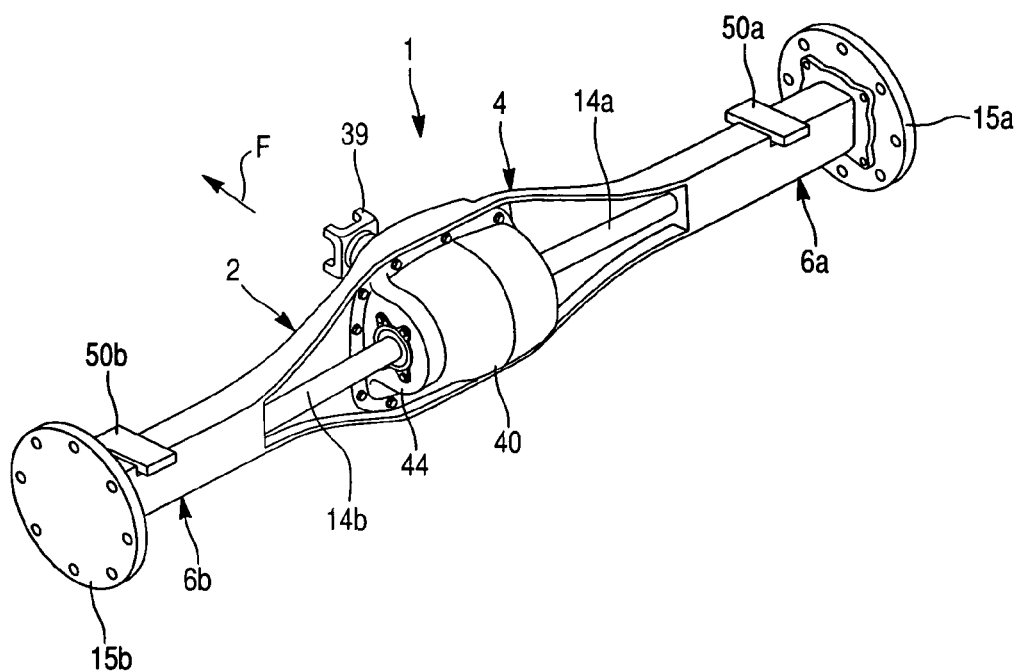
FIG. 3 is a perspective view from the rear of an axle assembly in accordance with the preferred embodiment of the present invention.
Figure 4:
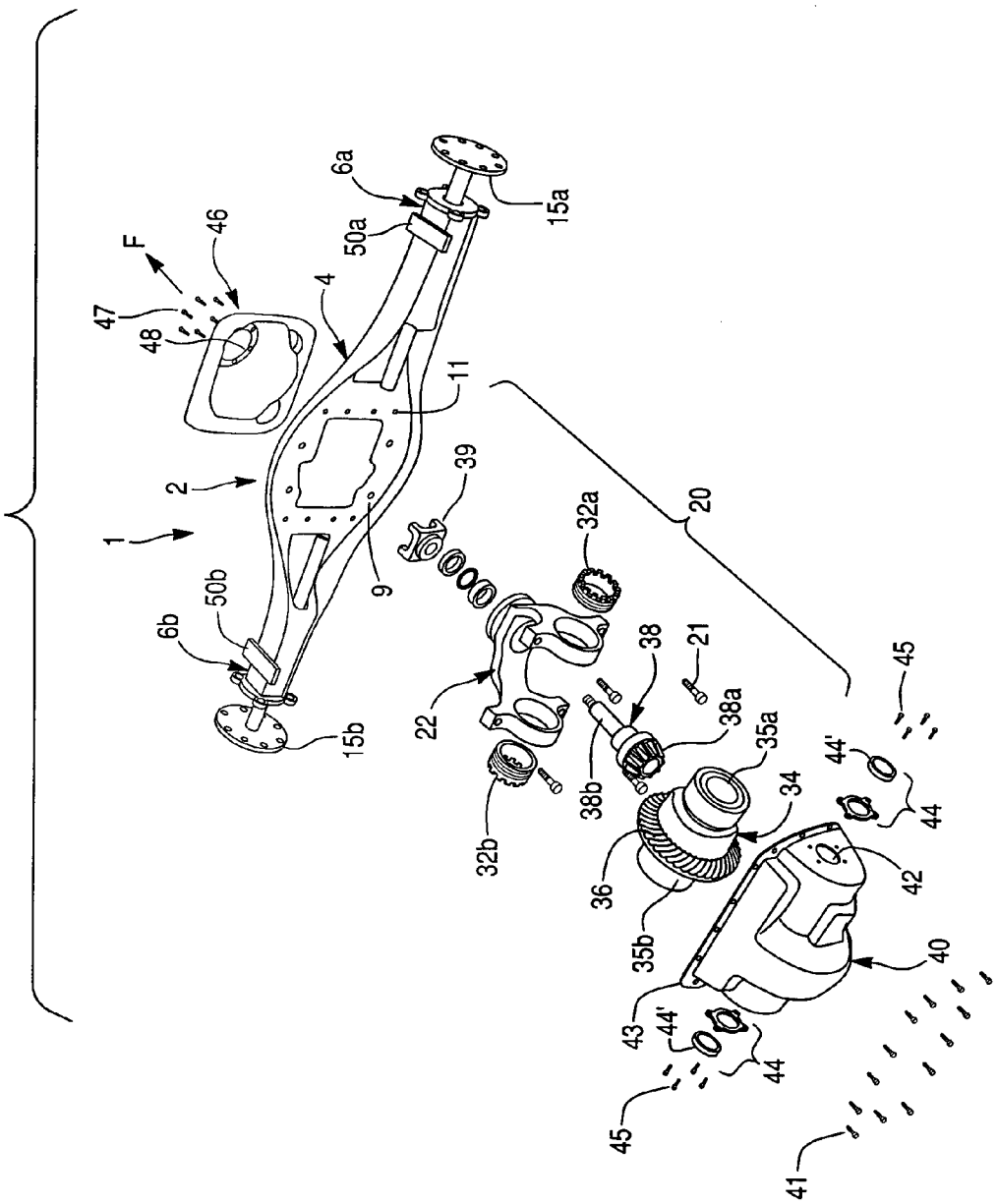
FIG. 4 is an exploded perspective view from the rear of the axle assembly in accordance with the preferred embodiment the present invention.
Figure 5:
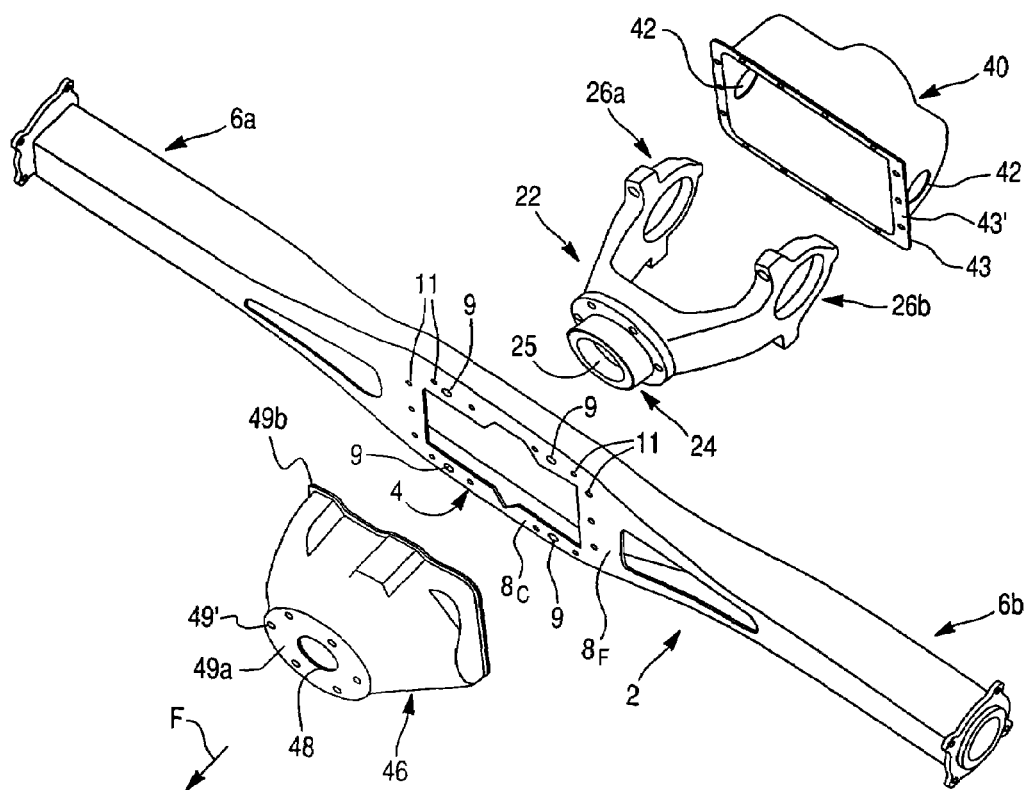
FIG. 5 is a partial exploded perspective view from the front of the axle assembly in accordance with the preferred embodiment the present invention.

FIGS. 3–5 depict a vehicle rigid drive axle assembly 1 in accordance with the first exemplary embodiment of the present invention. It will be appreciated that the present invention is equally applicable to an independent drive axle assembly, and may be used for both front and rear axle applications.

The rigid drive axle assembly 1 comprises a support beam member 2 having a substantially flat, enlarged central plate section 4 and two opposite, substantially tubular arm sections 6a and 6b axially outwardly extending from the central plate section 4. As illustrated, the flat central plate section 4 of the support beam member 2 is in the form of a substantially vertically oriented flat plate and defines a support plane that is substantially orthogonal to the driving direction F of the motor vehicle. Preferably, the arm sections 6a and 6b are formed integrally with the central plate section 4. The opposite arm sections 6a and 6b of the support beam member 2 may be provided with spring seats 50a and 50b, respectively.

The drive axle assembly 1 further comprises a differential assembly module 20 fastened to the enlarged central plate section 4 of the support beam member 2, and two opposite axle shaft members 14a and 14b outwardly extending from the differential assembly module 20, and rotatably supported by the arm sections 6a and 6b of the support beam member 2 so that the axle shaft members 14a and 14b are spaced from the central plate section 4 of the beam member 2 in the driving direction F of the motor vehicle. Distal ends of the axle shaft members 14a and 14b are provided with flange members 15a and 15b, respectively, adapted for mounting corresponding wheel hubs (not shown).

Figure 8:
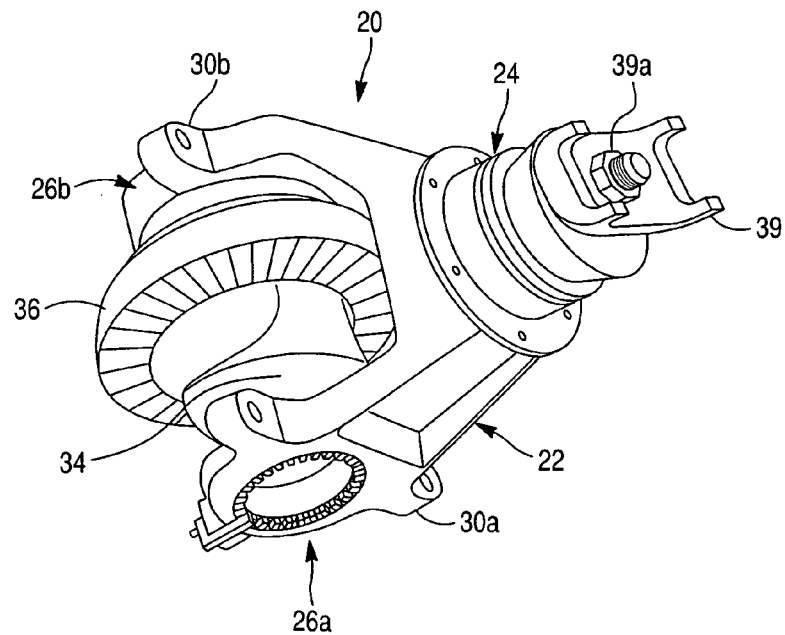
FIG. 8 is perspective view of a differential assembly module in accordance with the present invention.

The differential assembly module 20 shown in FIGS. 4 and 8, includes a differential carrier frame member 22 fastened to the central plate section 4 of the beam member 2, and provided for rotatably supporting a differential case 34 and a drive pinion 38. The differential case 34 houses a differential gear mechanism, well known to those skilled in the art. The drive pinion 38 has a pinion gear 38a in continuous meshing engagement with a ring gear 36, and a pinion shaft 38b operatively coupled to a vehicular propeller shaft (not shown) driven by a vehicular powerplant (not shown), such as an internal combustion engine, through an input yoke 39. Alternatively, a mounting companion flange (not shown) may be attached to a distal end of the pinion shaft 38b (instead of the input yoke 39) for coupling the pinion shaft 38b to the vehicular propeller shaft driven by the vehicular powerplant. The ring gear 36 is conventionally secured to the differential case 34 in any appropriate manner well known in the art.

Therefore, the differential assembly module 20 of the present invention is a self-contained unit wherein the differential carrier frame member 22 supports all the significant elements of the differential assembly and a final drive, such as the differential case 34 housing the differential gear mechanism, differential bearings 35a and 35b, threaded differential adjusters 32a and 32b, differential adjuster locks, oil seals, the drive pinion 38, drive pinion bearings, and the input yoke 39. Preferably, the differential carrier frame member 22 fastened to the central plate section 4 of the support beam member 2 using conventional fasteners, such as bolts 21. The differential carrier frame member 22 of the present invention improves the modularity of design of the differential assembly, substantially simplifies the assembly and servicing of the differential assembly, and reduces the number of required machining operations.

Figure 6:
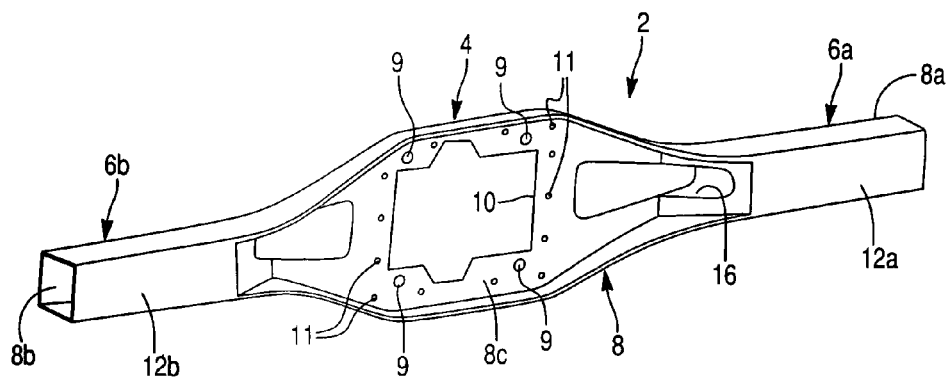
FIG. 6 is a perspective view of a support beam member of the axle assembly in accordance with the first exemplary embodiment of the present invention.

FIG. 6 depicts in detail the support beam member 2 in accordance with the first exemplary embodiment of the present invention. As was explained above, the support beam member 2 has the substantially flat, enlarged central plate section 4 and the two opposite, substantially tubular arm sections 6a and 6b axially outwardly extending from the central plate section 4. Preferably, in this embodiment, the support beam member 2 is formed of a single-piece C-channel body 8 manufactured by a metal deforming, such as stamping, having a substantially flat, enlarged central plate section 8c and two opposite arm sections 8a and 8b axially outwardly extending from the central plate section 8c.

As illustrated in FIG. 6, the flat central plate section 8c of the body 8 is in the form of a substantially vertically oriented flat plate. The enlarged central plate section 8c of the body 8 defines the central plate section 4 of the support beam member 2. The enlarged central plate section 8c has substantially flat front and rear mounting surfaces $8_F$ and $8_R$, respectively. The central plate section 8c is further provided with a central opening 10 therethrough adapted for receiving the differential carrier frame member 22 of the differential assembly module 20.

Figure 7:
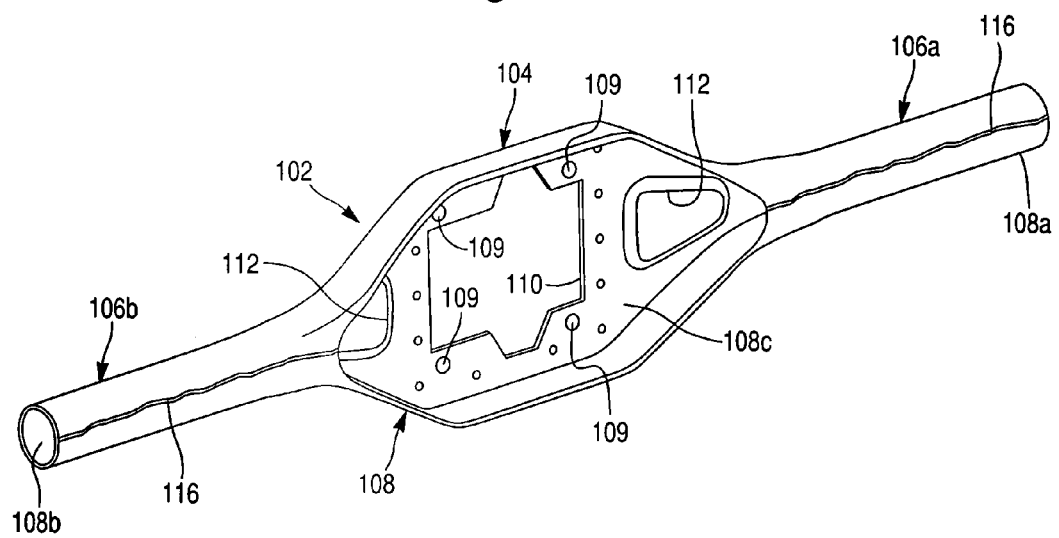
FIG. 7 is a perspective view of a support beam member of the axle assembly in accordance with the alternative embodiment of the present invention.

The support beam member 2 further includes two structural plates 12a and 12b attached to the arm sections 8a and 8b, respectively, in any appropriate manner, such as welding, so as to form the substantially tubular arm sections 6a and 6b of the support beam member 2 housing the axle shaft members 14a and 14b. As shown in FIG. 6, the tubular arm sections 6a and 6b of the support beam member 2 have substantially rectangular cross-section. Inward ends of each of the structural plates 12a and 12b is provided with a notch 16 receiving the axle shaft member 14a or 14b therethrough in a spaced relationship with respect to the central plate section 8c of the body 8 of the support beam member 2. Alternatively, the tubular arm sections 6a and 6b of the support beam member 2 have substantially circular cross-section, as illustrated in FIG. 7.

A plurality of mounting holes 9 are formed in the central plate section 8c adjacent to the central opening 10. The mounting holes 9 are adapted to receive the bolts 21 for fastening the differential carrier frame member 22 to the rear mounting surface 8R of the central plate section 8c of the body 8 of the support beam member 2. Preferably, the mounting holes 9 are smooth, and the plurality of bolts 21 with complementary nuts (not shown) are provided in order to fasten the differential carrier frame member 22 to the flat central plate section 4 of the support beam member 2. Alternatively, each of the mounting holes 9 is provided with a weld-on nut adapted to threadedly engage the complementary bolts 21. Further alternatively, the differential carrier frame member 22 is fastened to the flat central plate section 4 of the support beam member 2 using a plurality of threaded studs (not shown) fixed to the rear mounting surface $8_R$ of the central plate section 8c, in combination with complementary threaded nuts (not shown). Preferably, the threaded studs extend substantially orthogonally to the rear mounting surface $8_R$ of the central plate section 8c.

It will be appreciated that any appropriate manner of securing the differential carrier frame member 22 to the rear mounting surface $8_R$ of the central plate section 8c of the body 8 of the support beam member 2 is within the scope of the present invention.

In order to prevent the differential assembly module 20 from contamination and provide a supply of a lubricant, the differential assembly module 20 is enclosed into a housing formed by a rear cover 40 and a front cover 46 secured to opposite surfaces of the central plate section 4 of the beam member 2 in any appropriate manner well known in the art. In accordance with the preferred embodiment of the present invention, both the rear cover 40 and the front cover 46 are manufactured by metal stamping of any appropriate metal material, such as steel. Alternatively, the rear cover 40 could be made of any appropriate material, such as composite material (e.g. glass filled nylon). Preferably, the front cover 46 is welded to a front surface of the central plate section 4 of the beam member 2, while the rear cover 40 is fastened to a rear surface of the central plate section 4 of the beam member 2 using conventional fasteners 41. The front cover 46 has a front opening 48 (shown in FIGS. 4 and 5) for receiving therethrough a distal end of the pinion shaft 38b of the drive pinion 38. As illustrated in FIGS. 4 and 5, the front opening 48 is formed by a front flange collar 49a provided with a plurality of through holes 49' spaced apart substantially circumferentially, equidistantly around the front opening 48. The front cover 46 is further provided with a rear flange 49b adapted to juxtapose the front mounting surface $8_F$ of the enlarged central plate section 8c of the single-piece C-channel body 8.

As shown in FIGS. 4 and 5, the rear cover 40 incorporates two opposite through holes 42 (only one is shown in FIG. 4) for receiving the axle shaft members 14a and 14b therethrough. Each of the through holes 42 is provided with an adjustable flange device 44 provided with an axle shaft seal 44' adapted to seal the through hole 42 about the axle shaft members 14a and 14b. The adjustable flange device 44 is secured to the rear cover 40 adjacent to the through hole 42 therein by a set of screws 45 and is adapted to adjust a position of the axle shaft seal 44' relative to the through hole 42 of the rear cover 40. The rear cover 40 is further provided with a mounting flange 43 adapted to juxtapose the rear mounting surface $8_R$ of the enlarged central plate section 8c of the single-piece C-channel body 8. As illustrated in FIG. 5, the mounting flange 43 of the rear cover 40 is provided with a plurality of spaced apart through holes 43'.

The support beam member 2 further includes a plurality of smaller mounting holes 11 formed in the central plate section 8c of the body 8 adjacent to the central opening 10 for receiving the screws 41 adapted to fasten the rear cover 40 to the central plate section 4 of the support beam member 2. Preferably, the mounting holes 11 are provided with threads complementary to threads of the screws 41. Alternatively, the mounting holes 11 may be smooth, and a plurality of bolts with complementary nuts (not shown) are provided in order to fasten the rear cover 40 to the flat central plate section 4 of the support beam member 2. It will be appreciated that any appropriate manner of securing the rear cover 40 to the rear mounting surface $8_R$ of the central plate section 8c of the body 8 of the support beam member 2 is within the scope of the present invention.

Figure 9:
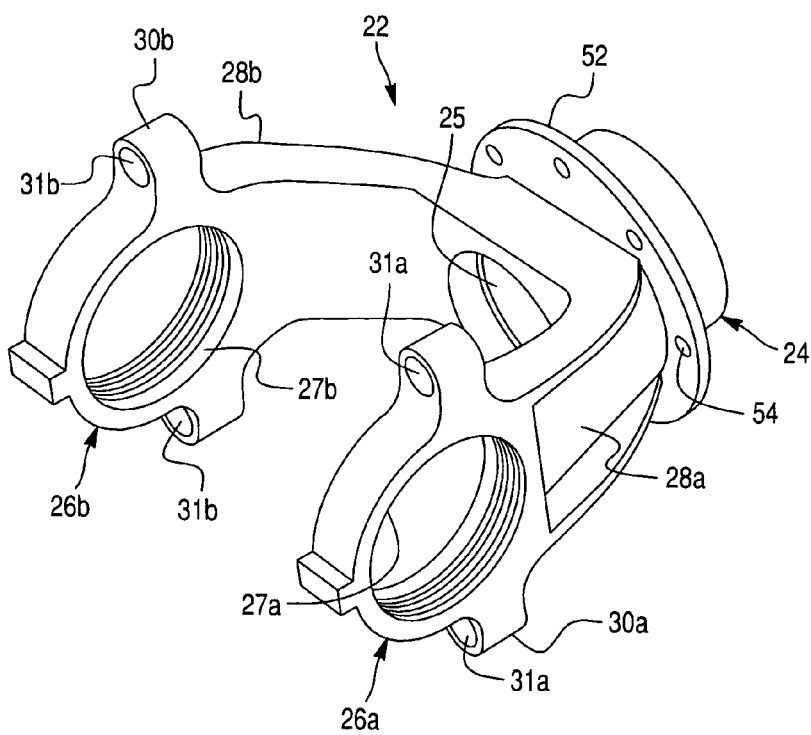
FIG. 9 is perspective view of a differential carrier frame member in accordance with the present invention.

The differential carrier frame member 22, illustrated in detail in FIG. 9, is, preferably, a single-piece metal part manufactured by casting or forging. The differential carrier frame member 22 has a generally Y-shaped configuration and includes a neck portion 24 and two opposite, axially spaced, coaxial bearing hub portions 26a and 26b attached to the neck portion 24 through respective leg portions 28a and 28b. The neck portion 24 has an opening 25 therethrough adapted for receiving and rotatably supporting the drive pinion 38 through an appropriate anti-friction bearing (not shown), preferably a tapered roller bearing. The bearing hub portions 26a and 26b are provided with respective openings 27a and 27b therethrough adapted for receiving appropriate anti-friction bearings 35a and 35b for rotatably supporting the differential case 34. Preferably, the anti-friction bearings 35a and 35b are tapered roller bearings. Moreover, the bearing hub portions 26a and 26b are provided with mounting flange portions 30a and 30b respectively, for fastening the differential carrier frame member 22 to the rear mounting surface $8_R$ of the flat central plate section 4 of the support beam member 2. Preferably, each of the mounting flange portions 30a and 30b has two mounting holes 31a and 31b, respectively, adapted to receive the screws 21. In an assembled condition of the drive axle assembly 1, the screws 21 extend through the mounting holes 31a and 31b in the differential carrier frame member 22 and threaded into the mounting holes 9 formed in the central plate section 8c of the body 8, thus fastening the differential carrier frame member 22 of the differential assembly module 20 to the central plate section 4 of the beam member 2. It will be appreciated that a geometric location of the mounting holes 9 in the central plate section 8c of the body 8 is substantially complementary to location the mounting holes 31a and 31b of the mounting flange portions 30a and 30b of the differential carrier frame member 22.

Alternatively, if the mounting holes 9 are smooth, the bolts 21 extend through the mounting holes 31a and 31b in the differential carrier frame member 22 and the mounting holes 9 to extend through the central plate section 8c of the body 8, and are threaded with the complementary nuts (or weld-on nuts) on the opposite side of the central plate section 8c, thus fastening the differential carrier frame member 22 to the central plate section 4 of the beam member 2.

Further alternatively, if the central plate section 8c of the body 8 of the support beam member 2 is provided with the plurality of the threaded studs extending rearwardly from the rear mounting surface $8_R$ of the central plate section 8c, the differential carrier frame member 22 is mounted to the central plate section 4 of the beam member 2 by the threaded studs extending through the mounting holes 31a and 31b in the differential carrier frame member 22, and fastened to the central plate section 4 of the beam member 2 with the complementary nuts. It will be appreciated that a geometric location of the threaded studs is substantially complementary to location the mounting holes 31a and 31b of the mounting flange portions 30a and 30b of the differential carrier frame member 22.

As further illustrated in FIG. 9, the neck portion 24 of the differential carrier frame member 22 has a substantially annular flange member 52 provided with a plurality of holes 54 spaced apart substantially circumferentially, equidistantly around the flange member 52. Preferably, the holes 54 are threaded. It will be appreciated that a geometric location of the through holes 54 is substantially complementary to location the through holes 49' of the front flange collar 49a of the front cover 46.

The preferred embodiment of a method of assembling the rigid drive axle assembly 1 in accordance with the present invention is performed in the following manner.

First, the front cover 46 is secured to the central plate section 8c of the C-channel body 8 of the support beam member 2 by welding the rear flange 49b of the front cover 46 to the front mounting surface $8_F$ of the central plate section 8c. It will be appreciated that any other techniques of securing the front cover 46 to the front mounting surface $8_F$, such as adhesive bonding, bolting, riveting, etc., is within the scope of the present invention.

Next, the differential assembly module 20 is assembled by mounting and securing the differential case 34 housing a differential gear mechanism and the drive pinion 38 to the differential carrier frame member 22. The input yoke 39 is attached to the distal end of the pinion shaft 38b by any appropriate means well known in the art, such as spline connection, and secured by a threaded nut 39a. The differential bearings 35a and 35b are preloaded by the differential adjusters 32a and 32b. Differential bearings supporting the drive pinion 38 are also preloaded.

Subsequently, the fully assembled and preloaded differential assembly module 20 is mounted to the support beam member 2 by fastening the differential carrier frame member 22 to the rear mounting surface $8_R$ of the support beam member 2 so that the neck portion 24 of the differential carrier frame member 22 extends trough the opening 10 in the central plate section 4 of the support beam member 2 and the distal end of the pinion shaft 38b of the drive pinion 38 of the differential assembly module 20 extends through the opening 48 in the front cover 46. In this position, the front flange collar 49a of the front cover 46 is juxtaposed to the annular flange member 52 of the neck portion 24 of the differential carrier frame member 22. More specifically, the mounting flange portions 30a and 30b of the differential carrier frame member 22 are fastened to the rear mounting surface $8_R$ of the enlarged, central plate section 8c of the C-channel body 8 of the support beam member 2 by threading of the bolts 21 inserted into the mounting holes 31a and 31b in the differential carrier frame member 22 and the mounting holes 9 to extend through the central plate section 8c of the body 8, and are threaded with the complementary nuts on the opposite side of the central plate section 8c, thus fastening the differential carrier frame member 22 to the central plate section 4 of the beam member 2.

Alternatively, if the central plate section 8c of the body 8 of the support beam member 2 is provided with the plurality of the threaded studs extending rearwardly from the rear mounting surface $8_R$ of the central plate section 8c, the differential carrier frame member 22 is mounted to the central plate section 4 of the beam member 2 by the threaded studs extending through the mounting holes 31a and 31b in the differential carrier frame member 22, and fastened to the central plate section 4 of the beam member 2 with the complementary nuts.

Then, the front flange collar 49a of the front cover 46 is fastened to the annular flange member 52 of the neck portion 24 of the differential carrier frame member 22 by a plurality of screws 47 extending through the through holes 49' of the front flange collar 49a of the front cover 46 and threaded into the threaded holes 54 in the annular flange member 52 of the neck portion 24 of the differential carrier frame member 22.

Afterward, the rear cover 40 is fastened to the axle support beam member 2 to cover a rear part of the differential assembly module 20 extending in a rearward direction from the central plate section 4 of the support beam member 2. More specifically, the rear cover 40 is placed over the rear part of the differential assembly module 20 so that the mounting flange 43 of the rear cover 40 is juxtaposed to the rear mounting surface $8_R$ of the central plate section 8c of the C-channel body 8 of the support beam member 2. Subsequently, the rear cover 40 is fastened to the rear mounting surface $8_R$ of the central plate section 8c of the body 8 by the plurality of the screws 41 extending through the corresponding through holes 43' in the mounting flange 43 of the rear cover 40 and threaded into the mounting holes 11 in the central plate section 8c of the body 8.

Next, the axle shaft members 14a and 14b inserted into the arm sections 6a and 6b of the support beam member 2 in an inward direction through the holes 42 in the rear cover 40 into a positive engagement with side gears of the differential gear mechanism of the differential assembly module 20 within the differential case 34.

It will be appreciated by those skilled in the art that alternatively the front cover 46 may secured to the central plate section 8c of the body 8 of the support beam member 2 after the differential assembly module 20 is fastened to the support beam member 2.

Therefore, the axle assembly in accordance with the present invention represents a novel method for assembling the drive axle assembly of a motor vehicle including the support beam member having the substantially flat central plate section and two opposite arm sections axially outwardly extending from the central plate section, the differential assembly module secured to the flat central plate section of the support beam member, and two opposite axle shaft members outwardly extending from the differential assembly module and rotatably supported by the arm sections in a spaced relationship with respect to the central plate section of the support beam member.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A method for assembling a drive axle assembly of a motor vehicle, said drive axle assembly comprising a support beam member and a differential assembly module, said method comprising the steps of:
   a) providing said support beam member having a central plate section provided with an opening therethrough and having substantially flat front and rear mounting surfaces;
   b) securing said differential assembly module to said central plate section of said support beam member so that said differential assembly module extends through said opening in said support beam member;
   c) securing a front cover and a rear cover to said central plate section of said support beam member.

2. The method for assembling said drive axle assembly as defined in claim 1, wherein said differential assembly module is fastened to said rear mounting surface of said central plate section of said support beam member.

3. The method for assembling said drive axle assembly as defined in claim 1, wherein said differential assembly module includes a differential carrier frame member having a neck portion for rotatably supporting a drive pinion and two opposite leg portions each provided with a bearing hub portion for rotatably supporting a differential case, and wherein the step of securing said differential assembly module to said central plate section includes the step of securing said differential carrier frame member of said differential assembly module to said central plate section of said support beam member so that said differential carrier frame member extends through said opening in said support beam member.

4. The method for assembling said drive axle assembly as defined in claim 3, wherein said differential carrier frame member of said differential assembly module is fastened to said rear mounting surface of said central plate section of said support beam member.

5. The method for assembling said drive axle assembly as defined in claim 4, wherein said differential carrier frame member is provided with a mounting flange portion for securing said differential carrier frame member to said rear mounting surface of said central plate section of said support beam member.

6. The method for assembling said drive axle assembly as defined in claim 5, wherein each of said bearing hub portions of said differential carrier frame member is provided with said mounting flange portion.

7. The method for assembling said drive axle assembly as defined in claim 3, further including the step of fastening said neck portion of said differential carrier frame member to said front cover.

8. The method for assembling said drive axle assembly as defined in claim 3, wherein said differential assembly module further includes differential bearings for rotatably supporting said differential case, said method includes the step of preloading said differential bearings prior to the step of securing said differential assembly module to said central plate section of said support beam member.

9. The method for assembling said drive axle assembly as defined in claim 1, wherein said support beam member of said drive axle assembly further includes two opposite arm sections extending from said central plate section.

10. The method for assembling said drive axle assembly as defined in claim 9, wherein said central plate section of said support beam member is enlarged relative to said arm sections.

11. The method for assembling said drive axle assembly as defined in claim 1, wherein said front cover is secured to said front mounting surface of said support beam member.

12. The method for assembling said drive axle assembly as defined in claim 11, wherein said front cover is secured to said front mounting surface of said support beam member by welding.

13. The method for assembling said drive axle assembly as defined in claim 1, wherein said rear cover is secured to said rear mounting surface of said support beam member.

14. The method for assembling said drive axle assembly as defined in claim 13, wherein said rear cover is secured to said rear mounting surface of said axle support beam member by a plurality of threaded fasteners.

15. The method for assembling said drive axle assembly as defined in claim 1, wherein said differential assembly module is secured to said central plate section of said support beam member by a plurality of threaded fasteners.

16. The method for assembling said drive axle assembly as defined in claim 1, wherein said central plate section of said support beam member has a substantially C-channel cross-section across the entire height thereof.

17. The method for assembling said drive axle assembly as defined in claim 1, wherein said drive axle assembly further comprises two opposite axle shaft members oppositely extending from said differential assembly module and said rear cover has two opposite through holes for receiving said axle shaft members therethrough.

18. The method for assembling said drive axle assembly as defined in claim 17, further including the step of mounting said axle shaft members to said drive axle assembly by inserting inboard ends of said axle shaft members through said through holes in said rear cover and positively coupling said inboard ends of said axle shaft members to a differential mechanism of said differential assembly module.

19. The method for assembling said drive axle assembly as defined in claim 3, wherein said front cover has a front opening for receiving therethrough said pinion shaft of said drive pinion.

20. A method for assembling a drive axle assembly of a motor vehicle, said drive axle assembly comprising a support beam member, a differential assembly module and two axle shaft members oppositely extending from said differential assembly module, said method comprising the steps of:
  a) providing said support beam member having an enlarged central plate section and two opposite arm sections extending from said central plate section, said central plate section provided with an opening therethrough and having substantially flat front and rear mounting surfaces;
  b) providing said differential assembly module including a differential mechanism rotatably supported by a differential carrier frame member having a neck portion for rotatably supporting a drive pinion and two opposite leg portions each provided with a bearing hub portion for rotatably supporting a differential case, each of said bearing hub portions of said differential carrier frame member is provided with a mounting flange portion;
  c) providing a front cover having a front opening for receiving therethrough a pinion shaft of said drive pinion;
  d) welding said front cover to said front mounting surface of said axle support beam member;
  e) fastening said mounting flange portion of said differential carrier frame member of said differential assembly module to said rear mounting surface of said central plate section of said support beam member by a plurality of threaded fasteners so that said differential carrier frame member extends trough said opening in said support beam member and said pinion shaft of said drive pinion of said differential assembly module extends through said front opening in said front cover;
  f) fastening said front cover to said neck portion of said differential carrier frame member by a plurality of threaded fasteners; and
  g) providing a rear cover having two opposite through holes for receiving said axle shaft members therethrough;
  h) fastening said rear cover to said rear mounting surface of said central plate section of said support beam member; and
  i) mounting said axle shaft members to said drive axle assembly by inserting inboard ends of said axle shaft members through said through holes in said rear cover and positively coupling said inboard ends of said axle shaft members to said differential mechanism of said differential assembly module.

* * * * *